United States Patent [19]
Nanos

[11] Patent Number: 5,561,356
[45] Date of Patent: Oct. 1, 1996

[54] SHREDDER MOTOR CIRCUIT WITH POWER FACTOR CORRECTION

[75] Inventor: Nicholas M. Nanos, Morton Grove, Ill.

[73] Assignee: Genersl Binding Corporation, Northbrook, Ill.

[21] Appl. No.: 230,769

[22] Filed: Apr. 21, 1994

[51] Int. Cl.$^6$ ............................................ H02P 5/00
[52] U.S. Cl. ..................... 318/729; 318/438; 318/809
[58] Field of Search ............................ 318/729, 438, 318/751, 816, 817, 268, 809, 640

[56] References Cited

U.S. PATENT DOCUMENTS

| | | | |
|---|---|---|---|
| 4,495,456 | 1/1985 | Vercillo et al. | 318/755 |
| 4,704,570 | 11/1987 | Hopkins | 318/729 |
| 4,800,326 | 1/1989 | Unsworth | 318/729 |
| 4,990,844 | 2/1991 | Gritter et al. | 318/762 |
| 5,008,608 | 4/1991 | Unsworth et al. | 318/729 |
| 5,038,091 | 8/1991 | Bashark | 318/809 |
| 5,099,183 | 3/1992 | Webe | 318/268 |
| 5,204,606 | 4/1993 | Kuwahara et al. | 318/800 |
| 5,241,256 | 8/1993 | Hatanaka et al. | 318/801 |
| 5,252,904 | 10/1993 | Nanos | 318/739 |
| 5,276,392 | 1/1994 | Beckerman | 318/751 |
| 5,373,223 | 12/1994 | Akagi et al. | 318/722 |

*Primary Examiner*—Brian Sircus
*Attorney, Agent, or Firm*—Hill, Steadman & Simpson

[57] ABSTRACT

A shredder motor circuit with power factor correction is provided. A permanent split capacitor motor under full load will run at peak efficiency with a high power factor. However, at no-load or at partial load the power factor will drop significantly, resulting in wasted energy and a possible overheating of the motor. This condition is inventively corrected by the present invention by lowering the voltage to the motor when the motor is partially loaded. The purpose of this shredder motor circuit with power factor correction is to vary the voltage to the motor instantaneously as the load changes due to increased amounts of paper placed in the shredder and thereby supplying the right amount of power required to result in higher efficiency and a cooler operating motor.

11 Claims, 8 Drawing Sheets

SHREDDER MOTOR CIRCUIT WITH POWER FACTOR CORRECTION

BACKGROUND OF THE INVENTION

1. Field of the Invention

The present invention is directed generally to a power factor correction circuit and specifically to a paper shredder motor power factor correction circuit for use in a paper shredder.

2. Description of the Prior Art

During the use of a paper shredder or a similar type of machine, it is quite common to experience a jam caused by an excessive number of pieces of paper being inserted into the machine. In this situation, to remove the material causing the jam, it is necessary to stop and reverse the shredder. In prior art systems, the operator intercedes when the jam occurs and shuts off power to the machine. The operator may then manually actuate the machine for reverse operation. Alternatively, it has been known to provide a current overload detector, such as circuit breakers of various types which are automatically triggered when an overload occurs in the motor. The operator then resets the circuit breaker and reverses the machine.

With the prior art systems, manual operator intervention is required. Additionally, a sophisticated current sensing system can be quite costly. Furthermore, circuit breakers which may rely on heating of a bi-metal element or the like, may have associated delays. During such a delay, the machine could be damaged.

Further, U.S. Pat. No. 4,495,456 relates to an automatic reverse system for a shredder which automatically causes reversal of the motor when the system becomes jammed. The invention provides for automatic reverse operation without operator intervention. However, the reference does not provide for immediate adjustment of the supply voltage for optimum performance.

A problem related to motors (especially shredder motors) is the changing of the load on the motor caused by different amounts of paper being shredded. The different loads cause operating problems with the motor. A permanent split capacitor motor under full load will run at peak efficiency with a high power factor. However, at no load or partial load, the power factor will drop significantly which results in wasted energy and an overheating of the motor. This condition can be corrected by lowering the voltage to the motor when the motor is partially loaded. As stated above, a paper jam in a shredder causes a great load on the motor used therein. Also, the number of sheets being shredded in a shredder at a particular time is directly proportional to the amount of load on the motor of the shredder.

Although a motor with greater torque may be used to supply sufficient power, it will still overheat under continuous duty. As a result, a shredder motor capable of continuous duty without overheating is needed. The voltage would need to be decreased under no load or reduced load conditions yet be capable of immediately supplying increased voltage with an increased load.

SUMMARY OF THE INVENTION

It is an object of the invention to provide a shredder motor circuit with power factor correction at relatively low cost that results in higher efficiency and a cooler operating shredder motor.

It is an object of the present invention to provide a shredder motor circuit maintaining continuous duty, whereby the voltage supplied to the motor is reduced under a partial or no load condition and is immediately increased as the load increases.

The above objects are achieved in accordance with the principles of the present invention in an apparatus have a shredder motor circuit with power factor correction, comprising a shredder having an alternating current drive motor, an AC power source, and power factor correction circuitry for varying a voltage to the motor instantaneously as the load changes thereby supplying the correct amount of power required.

An embodiment of the present invention provides a shredder motor power factor correction circuit having a shredder; a motor; means connectable to said AC voltage source for rectifying said AC voltage and for applying full-wave phase control AC voltage to said motor, said AC voltage exhibiting a phase which determines the power factor; a first voltage comparison means for conducting the comparison of a first reference voltage and a portion of the rectified voltage, the first comparison means generating an increasing first output signal when the portion of the rectified voltage is less than or equal to the first reference voltage; a second voltage comparison means for conducting the comparison of a second reference voltage and the first output signal, the second comparison means generating a second output signal when the first output signal is less than or equal to the second reference voltage; and a third voltage comparison means for conducting the comparison of a third reference voltage and the first output signal, the third comparison means generating a third output signal when said first output signal is less than or equal to the third reference voltage; and means for altering the phase and thereby setting the power factor dependent upon the second output signal.

DETAILED DESCRIPTION OF THE PRESENTLY PREFERRED EMBODIMENTS

Figure 1:
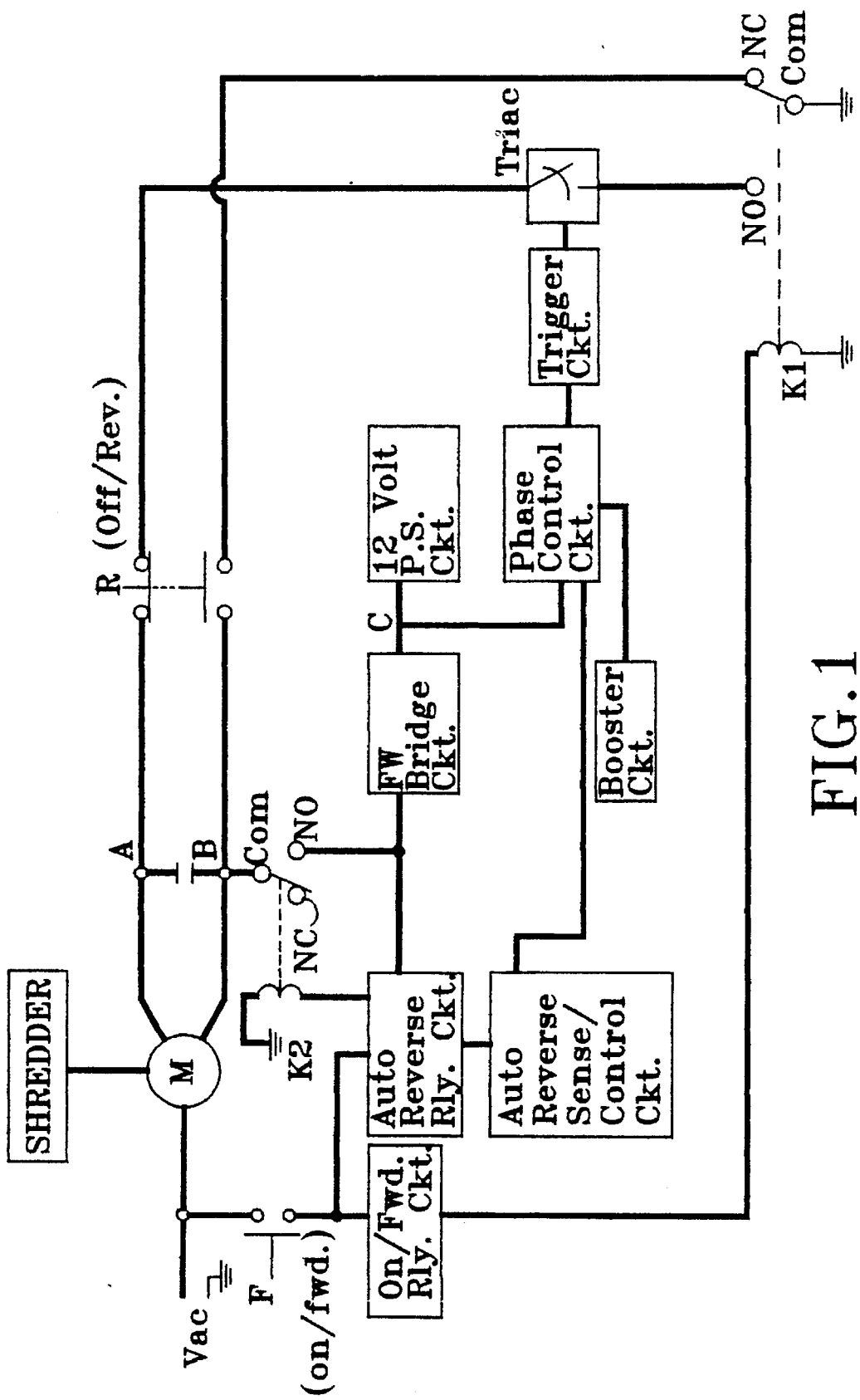
FIG. 1 is a simplified functional block diagram of the present invention.

FIG. 1 illustrates a block diagram circuit arrangement of the present invention using electrical schematic elements in combination with blocks to represent the appropriate circuitry for providing the objects of the invention. As illustrated in FIG. 1, an input AC voltage is provided to a motor. The motor is turned on and put into a forward operating position by depressing a switch F. The motor may be turned off or reversed by pressing a switch R. The shredder motor circuit provides an on/forward relay circuit to actuate normal operation of the shredder motor. In addition, an auto-reverse relay circuit is connected to relays and is also connected to an auto-reverse sense and control circuit. These circuits provide sensing and actuation means to reverse the direction of the motor when a jam occurs in the shredder.

A summary of an embodiment of the invention follows. As illustrated in FIG. 1, depressing the on/forward button F activates relays K1 and K2 which provide connections such that the input power is rectified in a full wave bridge circuit, (which is also illustrated schematically in FIG. 2). An additional feature of the present invention illustrated in FIG. 1 is the phase control circuit which is connected to the auto-reverse and the power supply circuitry. A 12 volt power supply circuit is also connected to the phase control circuit. Additionally, a booster circuit is connected to the phase control circuit for providing increased voltage to the motor under a heavy load condition. As a result, the conduction angle is approximately 180°. The phase control circuit is also connected to a trigger circuit which operates a triac to provide the proper power to the motor under varying load conditions.

A more detailed description of the on and forward operation of an embodiment of the present invention as summarized above with primary reference to the block diagram of FIG. 1 follows. The shredder motor circuit of the present invention can be operated by using a single switch. By momentarily closing the on/forward switch F, the operator thereby causes relay coils K1 and K2 to be energized. Both of the relays associated with the relay coils switch their respective contacts from their normally closed (NC) to their normally open (NO) positions. The AC voltage at point B is then full wave rectified at point C. The necessary voltages to the phase control circuit are thereby supplied to trigger the triac on. Point A is thus pulled to neutral and turns the motor on. The voltage at Point B is thereby immediately increased to approximately twice the line voltage due to the motor inductance and the motor capacitance. This increased voltage is applied to relay coils K1 and K2.

A description of the off and reverse operation of an embodiment of the present invention follows. As illustrated in FIG. 1, the motor of the present invention is turned off by momentarily depressing the switch R. Doing this opens the circuit to the motor winding at point A. If the switch R is held in a depressed condition, point B is pulled down to neutral through the normally closed (NC) contacts of relay K1, thereby energizing the motor in the reverse direction. The motor is turned off by releasing the switch R.

A description of the phase control circuit operation of an embodiment of the present invention follows. As illustrated in FIG. 1, the phase control circuit block is used in conjunction with the trigger circuit block to allow the triac to conduct power to the motor during a portion of the AC line cycle. As the load on the motor increases, the phase control circuit allows the triac to conduct power to the motor during a portion of the AC line cycle. As the load on the motor increases, the conduction angle increases thereby applying more power. Conversely, as the load to the motor decreases, the conduction angle decreases thereby applying less power.

A brief description of the operation of the booster circuit of an embodiment of the present invention follows. The booster circuit shown in FIG. 1 is connected to the phase control circuit and ensures that under heavy load maximum power is delivered to the motor. The conduction angle is approximately 180° degrees.

A description of the operation of the auto-reverse circuitry of an embodiment of the present invention follows. Also illustrated in FIG. 1 is an auto-reverse relay circuit which is connected to the auto-reverse sense control circuitry. The auto-reverse circuit senses a high load or paper jam condition and immediately reverses the direction of the motor to clear the throat of the shredder.

Figure 2:
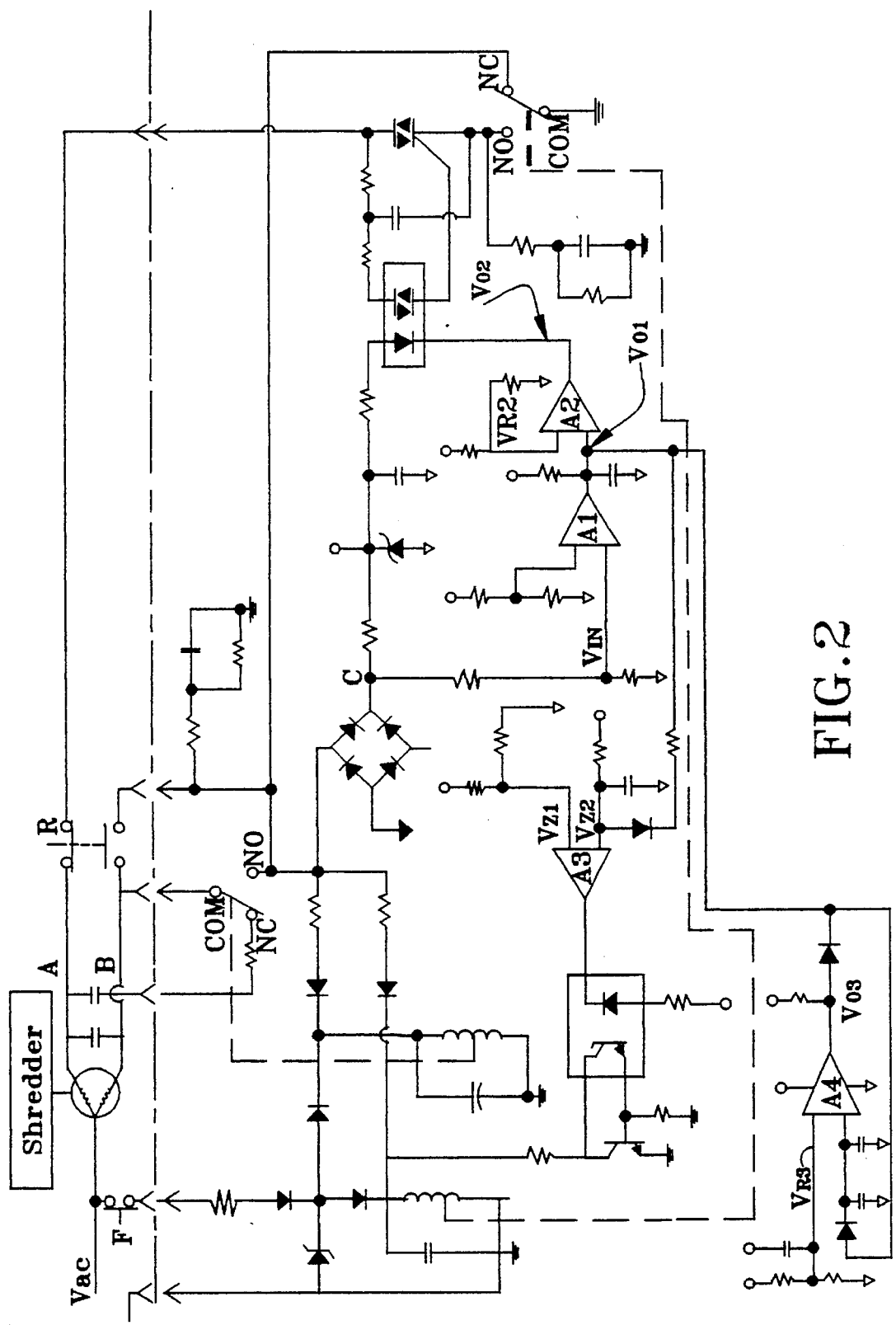
FIG. 2 is a schematic diagram of a preferred embodiment of the shredder motor circuit with power factor correction.

While FIG. 1 represents a basic block diagram schematic of the present invention, FIG. 2 illustrates a preferred embodiment of the present invention in more detailed schematic form. The basic block diagram components shown in FIG. 1 are represented by, for example, specific electrical components provided in the preferred embodiment.

A description of the operation with reference to the detailed schematic preferred embodiment shown in FIG. 2 follows. An AC line voltage is applied to a shredder motor, preferably a permanent split capacitor (PSC) motor. Momentarily closing the switch F energizes relay coils K1 and K2 through R1, CR5, CR3 and R1, CR5, CR1 respectively. Zener diode CR13 clamps the voltage to 24 VDC. The capacitors C1 and C2 filter the rectified voltage to maintain the relays energized. Both relays switch their respective contacts from their normally closed (NC) to their normally open (NO) positions. The AC voltage at point B is full wave rectified at point C. The necessary voltages are thereby supplied to the phase control circuit to trigger the triac ON. Point A is pulled to neutral and turns the motor ON. The voltage at point B immediately increases to approximately twice the line voltage due to the motor inductance and motor capacitance. This increased voltage is now applied to relay coils K1 and K2 via CR4,R3 and CR2,R2 respectively. Resistors R2 and R3 supply the necessary currents to keep the relays energized.

As also illustrated in FIG. 2, the motor of the present invention is turned off by momentarily depressing the switch R. Doing this opens the circuit to the motor winding at point A. If the switch R is held depressed, point B is pulled down to neutral through the normally closed (NC) contacts of relay K1, thereby energizing the motor in the reverse direction. The motor is turned off by releasing the switch R.

As further illustrated in FIG. 2, the rectified voltage at point C is fed to Zener diode CR12 and filter capacitor C5 through power resistor R12. A low regulated voltage (12 VDC) is thereby provided to power the comparator circuits and to set up all the voltage references. The voltage at point C is reduced via a voltage divider network R14, R15 and is fed as $V_{IN}$ to the negative input of A1. This voltage $V_{IN}$ is compared to a voltage reference $V_{R1}$ set by resistors R20 and R24. The output of A1 being an open collector is tied to an RC network made up of R22 and C7. A sawtooth wave voltage is generated by the RC network and fed as $V_{O1}$ to the negative input of A2. This voltage $V_{O1}$ is then compared to a second voltage reference $V_{R2}$ set by resistors R21 and R25. The output $V_{O2}$ of A2, being an open collector, pulls the cathode side of the emitter of an opto-coupler OC2 to ground. A trigger pulse is thereby generated to turn the triac Q2 ON. As a result, point A is pulled to neutral to turn the motor ON in the forward direction.

Under normal load conditions the amplitude of the sawtooth wave at $V_{O1}$ remains below the voltage reference $V_{R3}$ formed by voltage divider R26 and R27. However, under heavy load $V_{IN}$ falls below $V_{R1}$ which momentarily forces the sawtooth wave amplitude at $V_{O1}$ to exceed the voltage at $V_{R3}$. Immediately the output of A4, being an open collector, switches to force R28 to be tied in parallel to R22 through CR14. This causes C7 to charge more rapidly thereby generating a sawtooth wave with a steeper slope at $V_{O1}$. As a result, the triac fires sooner, increasing the conduction angle, thereby delivering maximum voltage to the motor. This higher voltage across the motor is reflected back to point C causing $V_{IN}$ to increase just above $V_{R1}$. The sawtooth wave with the steeper slope at $V_{O1}$ maintains the maximum voltage across the motor. The sawtooth wave is fed to the peak detector consisting of CR11 and C10. Since this amplitude is higher than $V_{R3}$, the output of A4 holds R28 in parallel with R22. As the heavy load disappears, the voltage at $V_{IN}$ increases triggering the triac ON at a later angle in the half cycle. The sawtooth wave amplitude drops which eventually causes the voltage at the positive input of A4 to fall below the voltage $V_{R3}$. The output of A4 pulls R22 to ground, thereby removing it from the sawtooth wave circuit completely.

A description of the operation of the auto-reverse circuitry of the present invention follows. The auto-reverse relay circuit is connected to the auto-reverse sense control circuitry. The auto-reverse circuit senses a high load or paper jam condition and immediately reverses the direction of the motor to clear the throat of the shredder.

Referring now to an embodiment of the present invention having the auto-reverse circuity illustrated in FIG. 2, the voltage at $V_{Z1}$ of A3 is compared to the reference voltage $V_{Z2}$, formed by resistors R16 and R17. Under normal conditions $V_{Z1}$ is maintained below $V_{Z2}$ by output $V_{O1}$. As C11 charges towards 12 volts, the output of $V_{O1}$ periodically goes low, thereby discharging C11 before it reaches $V_{Z2}$. When paper jams the shredder, the ramp voltage at $V_{O1}$ remains high long enough to reverse bias CR10 and allow C11 to charge towards 12 volts. When $V_{Z1}$ exceeds $V_{Z2}$, the output of A3 switches, consequently pulling the cathode side of emitter OC1 to ground. This turns the phototransistor of OC1 ON and subsequently switches Q1. The Q1 collector is pulled down quickly, thereby discharging capacitor C1 through R10. This de-energizes relay K1, thus causing the contacts to move back to the NC position. As a result, the motor is turned OFF in the forward direction and immediately pulls point B to neutral which turns the motor ON in the reverse direction. Since the junction of R2 and R3 is now tied to neutral, C2 starts to discharge through relay coil K2. Finally, relay K2 is de-energized thus causing the contacts to move back to the NC position. This turns OFF the motor thereby ending the auto-reverse mode.

As disclosed above, the shredder motor circuit having power factor correction is illustrated in FIG. 2. Certain reference points and voltages are labeled, including A, B, C, $V_{AC}$, $V_{IN}$, $V_{R1}$, $V_{R2}$, $V_{R3}$, $V_{O1}$, $V_{O2}$. In addition, these specific voltages are shown graphically in the following FIGS. 3–8.

Figure 3:
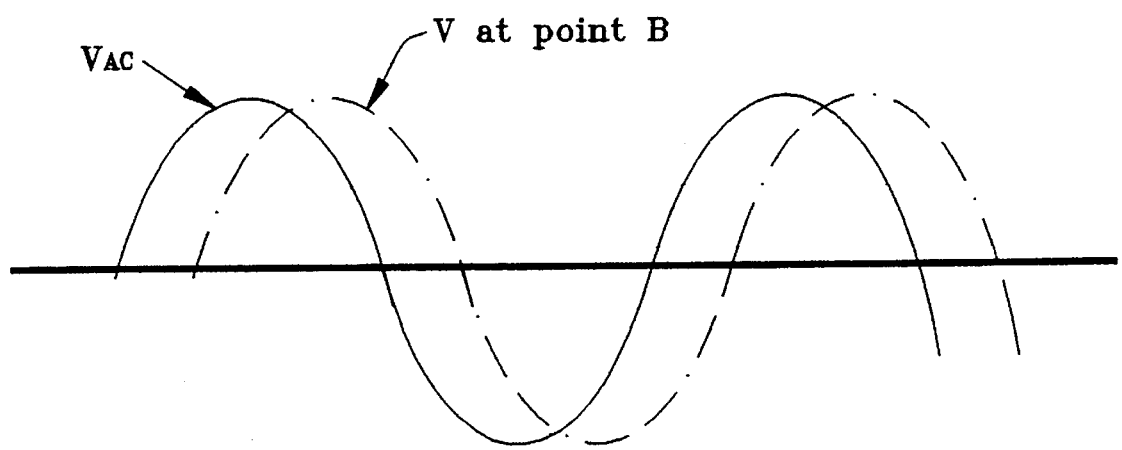
FIG. 3 shows a sinusoidal voltage curve of the present invention.
Figure 4A:
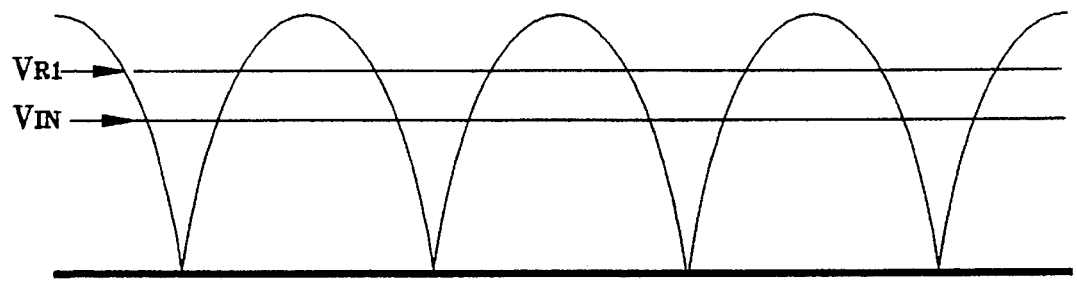
FIGS. 4–8 show voltage diagrams describing the operation of the shredder motor circuit having power factor correction of the present invention as the load on the motor varies.
Figure 4B:
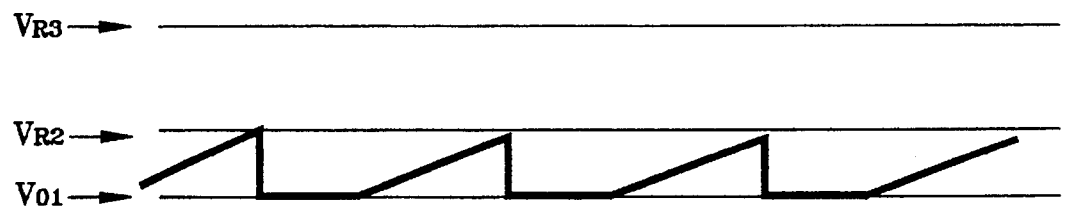
Figure 4C:
Figure 4D:
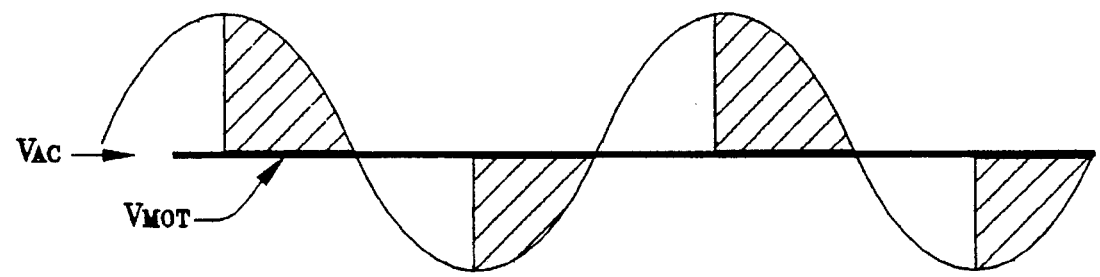
Figure 5A:
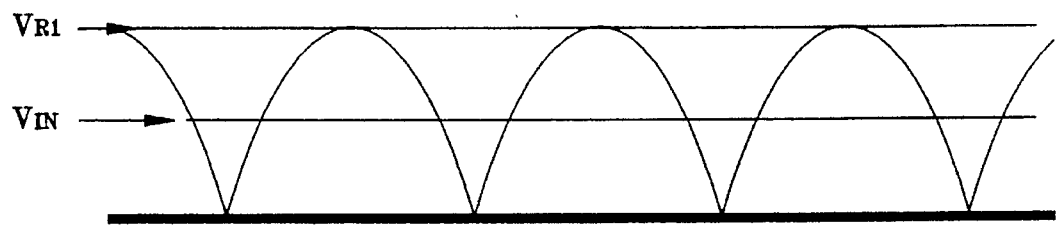
Figure 5B:
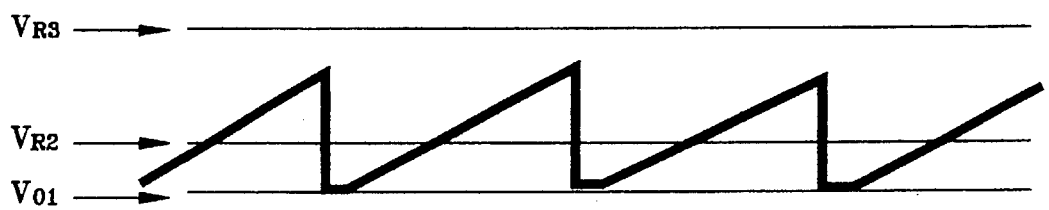
Figure 5C:
Figure 5D:
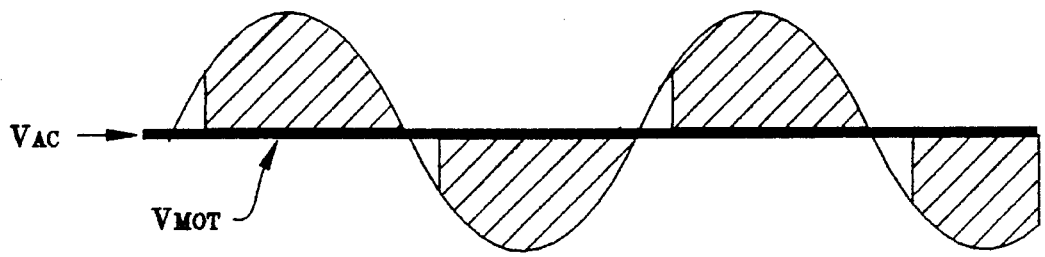
Figure 6A:
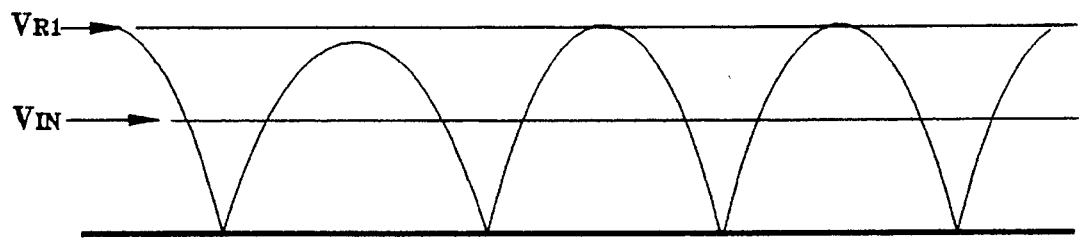
Figure 6B:
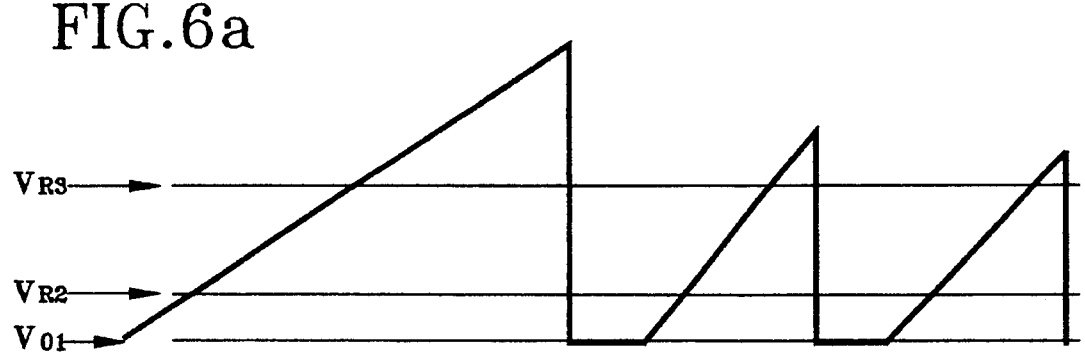
Figure 6C:
Figure 6D:
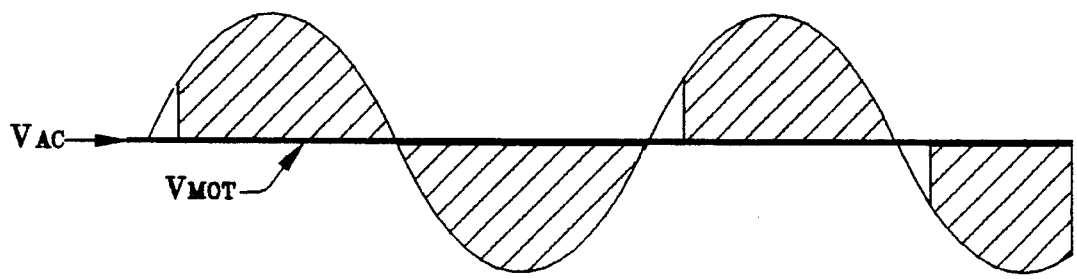
Figure 7A:
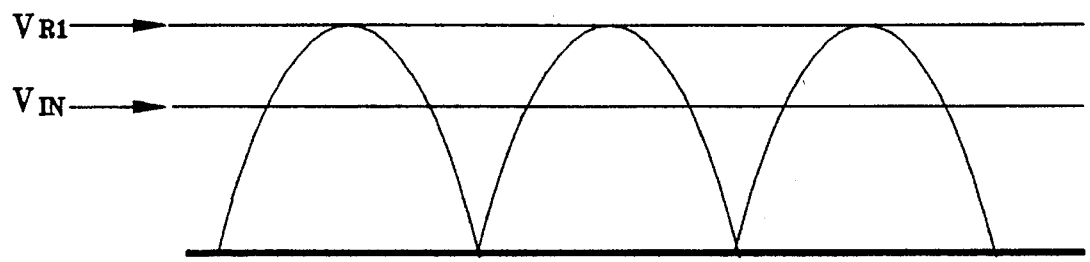
Figure 7B:
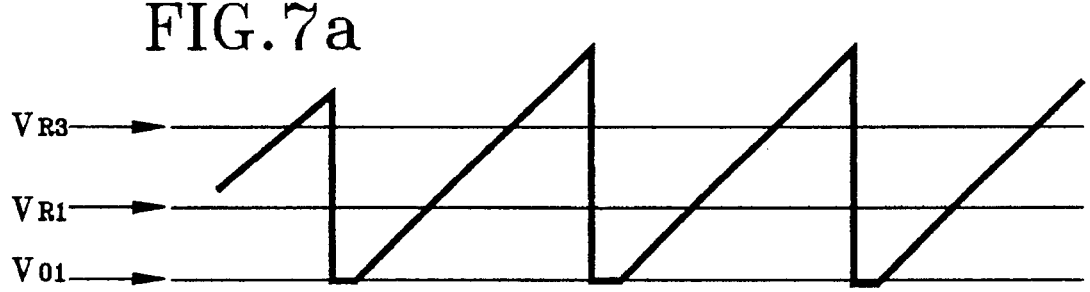
Figure 7C:
Figure 7D:
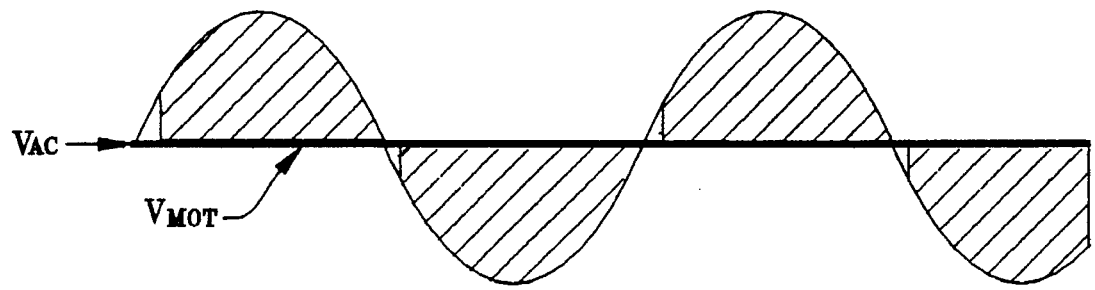
Figure 8A:
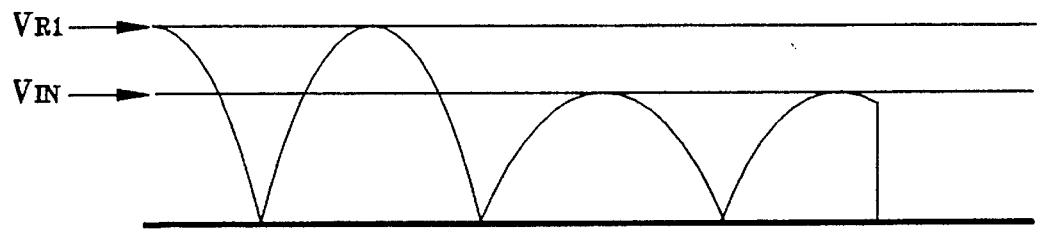
Figure 8B:
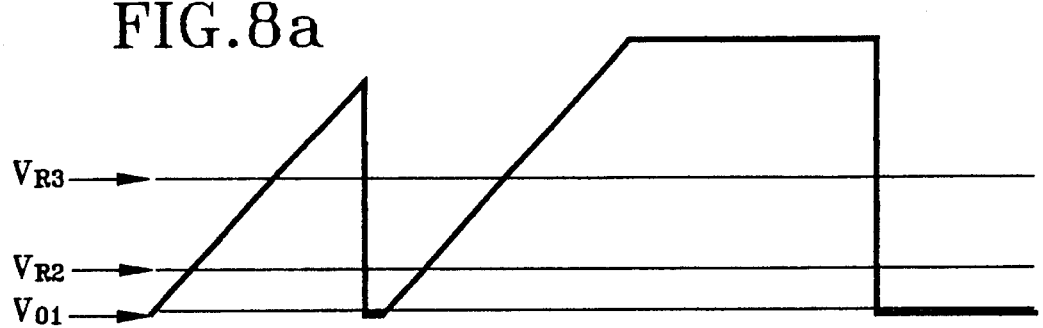
Figure 8C:
Figure 8D:
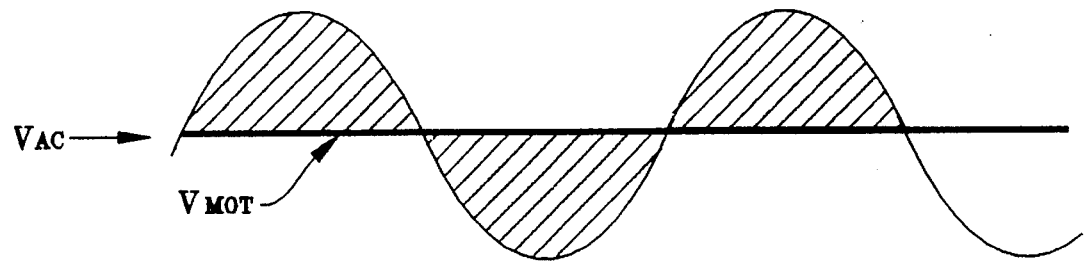

Referring to FIG. 3, the voltage at point B in the schematic of FIG. 2 varies inversely as a function of the load and also lags the line voltage $V_{AC}$ in the manner shown in FIG. 3. This voltage is rectified at reference point C as shown in FIG. 2 and is also fed into a first comparator circuit as $V_{IN}$.

FIGS. 4–8 show voltage diagrams that graphically describe the operation of the shredder motor circuit having power factor correction as the load on the shredder changes. It can be seen that as the load gradually increases, the voltage across the motor also increases. Further, as the load decreases, the voltage across the motor decreases.

FIG. 4 shows diagrams of the voltages of interest under a no-load or light load situation (i.e., in which 0 to 5 sheets of paper are fed into a shredder). The voltages are shown as a function of time. FIGS. 5–8 show the same information but with varying loads supplied to the shredder (i.e., a greater number of sheets of paper put into the shredder). Finally, FIG. 8 also shows a heavy load of greater than 16 sheets of paper, that would commonly cause the shredder motor to stall.

A basic description of FIGS. 4–8 follows. The (a) graph shows the rectified voltage $V_{IN}$ and also the reference voltage $V_{R1}$ of the first comparator means. The (b) graph shows the output voltage $V_{O1}$ of the first comparator means and also reference voltages $V_{R2}$ and $V_{R3}$ from the second comparator means and the third comparator means, respectively. For example, $V_{O1}$ is low when $V_{IN}$ exceeds $V_{R1}$ and is an increasing ramp voltage otherwise. The (c) graph of each figure shows the output voltage $V_{O2}$ of the second comparator means. For example, $V_{O2}$ is in a high state during periods when $V_{R2}$ exceeds $V_{O1}$ and transitions to a low state when $V_{O1}$ exceeds $V_{R2}$. Also, when $V_{O1}$ goes low, $V_{O2}$ transitions to a high state. When $V_{O1}$ exceeds $V_{R2}$ and $V_{R3}$, $V_{O2}$ remains in a low state. The (d) graph of each figure shows the line voltage $V_{AC}$ and the motor voltage $V_{MOT}$. As shown, $V_{MOT}$ is fully applied when $V_{O2}$ transitions from a high to a low state.

Although various minor modifications may be suggested by those versed in the art, it should be understood that I wish to embody within the scope of the patent granted hereon, all such modifications as reasonably and properly come within the scope of my contribution to the art.

I claim:

1. A shredder motor power factor correction circuit for use with an AC voltage source, comprising:

a motor;

means connectable to said AC voltage source for applying full-wave phase control AC voltage to said motor, said AC voltage exhibiting a phase which determines the power factor;

a first comparison means for conducting a comparison of a first reference voltage and a portion of said full-wave phase controlled AC voltage, said first comparison means generating an increasing first output signal when said portion of said full-wave phase controlled voltage is less than or equal to said first reference voltage;

a second comparison means for conducting a comparison of a second reference voltage and said first output signal, said second comparison means generating a second output signal when said first output signal is less than or equal to said second reference voltage;

a third comparison means for conducting a comparison of a third reference voltage and said first output signal, said third comparison means resetting said first output signal to a predetermined value when said first output signal is greater than or equal to said third reference voltage;

means for altering said phase and thereby setting said power factor dependent on said second output signal; and opto-electronic coupler means for sensing when said second output signal is low for use in said means for altering said phase and thereby setting said power factor.

2. The shredder motor circuit of claim 1, wherein said motor is a permanent split capacitor motor.

3. The shredder motor power factor correction circuit of claim 1, wherein said first comparison means for generating an increasing first output signal includes an RC circuit.

4. The shredder motor power factor correction circuit of claim 1, further comprising circuit means for reversing said motor when a jam occurs in the shredder, said circuit means connected to said means for altering said phase.

5. The shredder motor power factor correction circuit of claim 1, further comprising means for sensing when said second output signal is low for use in said means for altering said phase and thereby setting said power factor.

6. The shredder motor power factor correction circuit of claim 1, wherein said first output signal is a sawtooth waveform wherein said waveform is reset to ground when said portion of said full-wave phase controlled AC voltage exceeds said first reference voltage.

7. The shredder motor power factor correction circuit of claim 1, wherein said first comparison means includes an operational amplifier for receiving said first reference voltage at a first input terminal thereof and said portion of said rectified voltage at a second input terminal thereof, said first output signal being available at an output terminal of said operational amplifier.

8. The shredder motor power factor correction circuit of claim 1, wherein said second comparison means includes an operational amplifier for receiving said second reference voltage at a first input terminal thereof and said first output signal at a second input terminal thereof, said second output signal being available at an output terminal of said operational amplifier.

9. The shredder motor power factor correction circuit of claim 1 wherein said means for altering includes a triac wherein said trial is connected to said opto-electronic coupler such that when said second output signal is low, said opto-electronic coupler turns on to trigger said trial on thereby turning the motor in a forward direction.

10. The shredder motor power factor correction circuit of claim 1, wherein said means for rectifying includes a bridge rectifier circuit.

11. A method for correcting a power factor in a shredder motor circuit having a shredder and a motor, comprising the steps of:

connecting an AC voltage source to said motor;

applying full wave phase control AC voltage to said motor, said AC voltage exhibiting a phase which determines the power factor;

comparing a first reference voltage to a portion of said full-wave phase controlled voltage and providing an increasing first output signal when said portion of said full-wave phase controlled voltage is less than or equal to said first reference voltage;

comparing a second reference voltage to said first output voltage and providing a second output signal when said first output signal is less than or equal to said second reference voltage;

comparing a third reference voltage to said first output signal and resetting said first output signal when said first output signal is greater than or equal to said third reference voltage;

altering said phase and thereby setting said power factor dependent on said second output signal; and electro-optically sensing when said second output signal is low for use in said step of setting said power factor.

* * * * *